United States Patent [19]

Franco et al.

[11] 3,907,573

[45] Sept. 23, 1975

[54] SILVER HALIDE PHOTOGRAPHIC EMULSIONS WITH IMPROVED PHYSICAL CHARACTERISTICS

[75] Inventors: Simone Franco, Cuneo; Marcello Puccini; Angelo Vallarino, both of Savona, all of Italy

[73] Assignee: Minnesota Mining and Manufacturing Company, St. Paul, Minn.

[22] Filed: Mar. 11, 1974

[21] Appl. No.: 449,606

Related U.S. Application Data

[63] Continuation-in-part of Ser. No. 174,269, Aug. 23, 1971, abandoned.

[30] Foreign Application Priority Data

Aug. 21, 1970  Italy.................................. 52966/70

[52] U.S. Cl.................................. 96/114; 96/114.5

[51] Int. Cl.².......................................... G03C 1/04
[58] Field of Search........................... 96/114, 114.5

[56] References Cited
UNITED STATES PATENTS

| | | | |
|---|---|---|---|
| 2,739,891 | 3/1956 | Knox et al. ........................ | 96/114.5 |
| 3,003,877 | 10/1961 | McLaughlin et al............... | 96/114.5 |
| 3,241,970 | 3/1966 | Popeck ................................ | 96/114 |
| 3,459,790 | 8/1969 | Smith.................................. | 96/114 |
| 3,772,032 | 11/1973 | Pearson et al. ..................... | 96/114 |

*Primary Examiner*—Ronald H. Smith
*Attorney, Agent, or Firm*—Alexander, Sell, Steldt & Delahunt

[57] ABSTRACT

Silver halide photographic emulsions which contain gelatin and a hydroinsoluble dispersed polymer prepared by emulsion polymerization in the presence of a salt of a N-acyl-sarcosine.

9 Claims, No Drawings

SILVER HALIDE PHOTOGRAPHIC EMULSIONS WITH IMPROVED PHYSICAL CHARACTERISTICS

This application is a continuation-in-part of U.S. application Ser. No. 174,269, filed Aug. 23, 1971, now abandoned.

The present invention relates to silver halide photographic emulsions with improved physical characteristics and photographic materials obtained therefrom.

The photographic emulsions usually consist of a silver halide particles dispersion in a hydrophilic hydropermeable binder. Gelatin, which possesses many useful characteristics from the viewpoint of photographic technology, is ordinarily employed as the binder.

In order to avoid problems associated with the propensity of gelatino-silver halide photographic elements to be fragile, prone to abrasion damage, slow to dry after processing and to tend to curl, gelatin binders have often been modified by addition of certain synthetic polymers thereto. In particular, water-insoluble polymers dispersed in the form of very small particles and obtained by emulsion polymerization techniques have found wide use as partial replacements for gelatin in silver halide photographic emulsions. Said polymers dispersions in water or latexes are usually prepared by dispersing one or more monomers in water in the presence of a dispersant or surfactant (for example sodium lauryl sulfate, ammonium-cetyl-trimethyl chloride, etc.) and affecting polymerization through use of a hydrosoluble initiator which is generally a per compound (ammonium or potassium persulfate, hydrogen peroxide, sodium perborate, etc.), a redox system such as, persulfate-bisulfite, or hydrosoluble azo-initiators of the type $\alpha,\alpha'$-azo-bis-isobutyramidine hydrochloride, 4-4'-azo-bis-4-cyanpentanoic acid, etc. (U.S. Pat. Nos. 2,739,137; 2,599,300 and the British Patent No. 759,409). The surfactant remains in the resin dispersion and therefore is also incorporated in the photographic emulsion.

The presence of surfactants of the above mentioned type may cause, for example, detrimental sensitometric effects (as when cationic or non-ionic dispersants are employed). Those dispersants which are most widely used for the preparation of polymeric latexes having particles of very small dimensions (for example, alkyl sulfates such as sodium lauryl sulfate, the sulfosuccinates such as di-octyl-sulfosuccinate, di-decyl-sulfosuccinate, etc.) tend to confer low wettability to the gelatino silver halide layers which include such latexes.

Moreover, such layers do not dry uniformly after processing. The water film superficially adhering to the layer surface, after manual processing, distributes itself in streamlets and spots. As a consequence of this non-uniform drying the processed photographic material shows zones of different density, appearing as spots which often are quite detrimental, as it may lead to an erroneous diagnosis.

It is known that a number of different types of "spotting" can occur on photographic films. One type of spotting is caused by lack in coating uniformity (uncoated areas) which manifest themselves as "repellency spots". Another defect originated during the coating of the emulsion layer may result in surfaces that cannot be rewet readily by the developing solutions. These difficult-to-rewet areas will appear as small undeveloped areas in the processed product. Metallic impurities in the emulsion can also leave spots in the processed element. Finally, spots or areas of non-uniform density may result as a consequence of non-uniform drying of the film after exposing, developing, fixing and washing. This non-uniform drying is very likely due to non-uniform wettability of the developed and fixed emulsion layer. The last kind of spot defect is known as "drying spot".

There is a basic distinction to be made between the spotting originating from the other above referred defects and the last one. In fact the spottings caused by the preceding defects become evident on the processed film before drying and can be already seen on the wet film, whereas the drying spots do not appear at all on the wet film, and only become visible after drying.

It is an object of the present invention to provide a method for effectively inhibiting the formation of drying spots on processed photographic layers consisting of silver halide emulsions which include as a binder a mixture of gelatin and at least a water insoluble dispersed polymer.

It is still another object of the present invention to provide silver halide photographic elements which after processing are substantially free of drying spots.

According to the present invention, it has been found that the tendency of photographic layers, which include as a binder a mixture of gelatin and water insoluble dispersed polymer(s) of yielding drying spots upon processing can be substantially prevented if the salts of a N-acyl-sarcosine, such as for example sodium N-lauroyl-sarcosinate, ammonium N-lauroyl-sarcosinate, sodium N-oleoyl-sarcosinate, sodium 4-nonyl-phenoxyacetyl-sarcosinate, sodium N-palmitoyl-sarcosinate, sodium N-decanoyl-sarcosinate, etc., are used as dispersants in the preparation of the polymeric latexes employed, with gelatin, as the binder in such layers. This effect has been found applicable to an extensive range of polymers, copolymers, and mixtures thereof.

Accordingly, the invention in one embodiment relates to a photosensitive silver halide emulsion which includes, as a binder, a mixture of gelatin and a hydroinsoluble dispersed polymer prepared by emulsion polymerization in the presence of a dispersant of the general formula

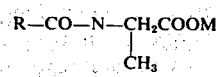

where R is a saturated or unsaturated hydrocarbon chain containing from 8 to 17 C atoms, possibly carrying an aromatic ring and M is an alkali metal atom or ammonium.

In another embodiment, the invention relates to an improvement in the preparation of a photosensitive gelatino silver halide emulsion, the improvement comprising adding, to a gelatino silver halide photographic emulsion, a latex of a polymer obtained by the emulsion polymerization of ethylenically unsaturated monomers in the presence of a dispersant of the formula

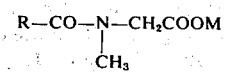

wherein R is a saturated or unsaturated hydrocarbon chain containing from 8 to 17 C atoms, possibly carrying an aromatic ring and M is an alkali metal atom or ammonium.

The monomers preferably used in preparing the desired latexes are ethylenically unsaturated monomers. Such monomers include those having one or two unsaturated ethylenic groups of the acrylic and methacrylic ester type, such as ethyl acrylate, methyl methacrylate, methyl acrylate, butyl methacrylate, etc.; alkyl-substituted acrylamides such as N,N-dibutylacrylamide, N-octylacrylamide, etc.; vinyl esters such as vinyl acetate, vinyl butyrate, etc.; dienes such as butadiene, isoprene, dimethylbutadiene, chloroprene, fluoroprene, etc.; aromatic compounds such as styrene, vinyltoluene, etc.; vinyl halides such as vinyl chloride and vinylidene chloride; acrylonitrile, methacrylonitrile, vinyl-pyridines, vinyl-quinolines and other commonly known similar monomers. It is often advantageous to use in the latex preparation, together with the herein above mentioned monomers, smaller amounts of hydrosoluble monomers such as acrylic and metacrylic acids, acrylamide, N-methylacrylamide, metacrylamide, vinylpyrrolidone, vinyloxazolidone, potassium vinyl benzene sulfonate etc. The use of functional reticulant monomers such as ethyleneglycoldimethacrylate, methylenbisacrylamide, divinylbenzene and similar may also often be desirable.

According to the present invention, emulsions with improved physical characteristics may be prepared by incorporating into a gelatino silver halide emulsion a polymeric latex prepared by adding, with strong stirring to an aqueous alkali metal or ammonium N-acyl-sarcosinate solution, one or more ethylenically unsaturated monomers, and heating the dispersion thus obtained in presence of a free radical initiator. The polymer is preferably added after ripening and digestion of the silver halide emulsion, and, as a rule, is added to the emulsion just before coating thereof.

The amount of latex to be added to the photographic emulsion may vary within wide limits according to type of the polymer employed and also according to the effect desired. In general, from about 10% to 80% of latex (dry weight basis) with respect to the gelatin may be added. In general the variation in physical characteristics is related to the amount of latex (hydrosol) added. The amount of N-acyl-sarcosinate used in the dispersion, of course, may also vary within wide limits.

The present invention has been demonstrated to be useful with silver chloride, chloro-bromide, bromide and bromoiodide emulsions and with mixtures thereof. The emulsion may contain, as colloids besides gelatin, other natural or synthetic polymers such as, for example, soluble derivatives of cellulose, dextran, polyvinyl alcohol, polyvinylpyrrolidone, poly-β-alanine (Italian Patents No. 660,471 and No. 696,021), poly-β-acrylamide propionamide (Italian Patent No. 731,800), partially hydrolized polyvinyl acetate, polyacrylamide and its copolymers, polyamides and, in general, natural or synthetic water permeable colloids. The emulsion can be chemically sensitized by ripening with naturally active gelatin or by addition of chemical sensitizers such as, for instance, thiosulfate allylthiourea, and other compounds containing labile sulfur. The sensitization can also be obtained by the use of salts of noble metals, such as gold salts alone or associated with sensitizers of the sulfurizing type. They can also contain potassium chloro-platinate, ammonium chloropalladate, etc. The emulsion may contain one or more spectral sensitizers, (for example cyanines, carbocyanines, merocyanines) and supersensitizers as well as couplers, hardeners, stabilizers, antifogging agents, plasticizers, antioxidants, development accelerators, etc., and may be spread onto any type of support such, for example, cellulose ester film, polystyrene, polycarbonate, polyester, paper, glass, etc.

As a consequence of the present invention, the physical characteristics of a photographic emulsion (e.g., wettability) are generally improved. The wettability of the finished photographic element can be very well represented by contact angle values (the smaller the angle, the better the wettability).

The contact angle values reported below have been obtained according to the formula reported by Richter and Volke in Zeit. Wiss. Ph. 54, 57–81 (1960), by determining with DognonAbribat tensiometer the immersion and emersion work of a wet photographic film (after development, fixing and washing), perpendicularly introduced into water.

The invention may be more readily appreciated by reference to the following illustrative, non-limiting examples:

EXAMPLE 1

In a 500 cc flask, supplied with stirrer, reflux condenser, dropping funnel and internal thermometer, 2.5 g of sodium lauroyl-sarcosinate were dissolved at 50°C. in 150 cc of distilled and degassed water; then 10 cc of recently distilled ethyl acrylate and 0.02 g of ammonium persulfate were added with vigorous stirring. The temperature was gradually raised to 85° C., and the initiation of polymerization was indicated by a strong reflux. After a few minutes, 50 cc more of ethyl acrylate were added. The temperature was then gradually raised to 90° C and maintained constant for about one hour with vigorous stirring. Unreacted traces of monomer were thereafter removed by steam distillation, and the latex thus obtained was cooled to room temperature and filtered.

The degree of conversion to polymer was determined by analysis of the solid content in the latex. The average dimensions of the particles were determined by turbidimetry (according to the method of Heller and Pagonis J. Chem. Phys., 22, 948–949, 1954). A 97% conversion to polymer was obtained. The average diameter of the particles was about 500 A.

EXAMPLE 2

Example 1 was repeated except that 1.5 g of sodium N-palmitoyl-sarcosinate was employed instead of sodium lauroyl sarcosinate. A 95% conversion to polymer was obtained. The average diameter of the particles was about 600 A.

EXAMPLE 3

Example 1 was duplicated using, as the monomer, a mixture 30/70 by volume of butyl-acrylate and methyl-methacrylate. The polymer conversion was of 98%. The average diameter of the particles was about 550 A.

EXAMPLE 4

In a 500 cc flask, 1.5 g of N-oleoyl-sarcosine was dissolved in 150 cc of distilled water at pH 8.5 using ammonium hydroxide at a temperature of 80°C. Then 50 cc of recently distilled styrene and 0.05 g of ammonium persulfate were added with vigorous stirring. At the end of the exothermic phase, the dispersion was maintained at 90°C for one hour. The residual monomer was removed by steam distillation. The reaction mass then was cooled and filtered. The polymer conversion was 93% and the average diameter of the particles was of the order of 650 A.

EXAMPLE 5

Example 1 was duplicated using 2.5 g of sodium-N-decanoyl-sarcosinate as the dispersant and 50 cc of ethylmethacrylate as the monomer.

EXAMPLE 6

Example 5 was duplicated using as the monomer 30 cc of N,N-dibutyl-acrylamide. A poly-dibutyl-acrylamide latex was obtained.

EXAMPLE 7

Example 3 was duplicated using, as the monomer, 95/5 by volume mixture of ethyl-acrylate/N-vinyl-2-oxazolidone. The conversion to ppolyer was 96%.

EXAMPLE 8

Example 1 was duplicated utilizing, as polymerization initiator, 0.5 g of 4,4'-azo-bis-4-cyanpentanoic acid. The conversion to polymer was 95% and the average dimensions of the particles were about 550 A.

EXAMPLE 9

Example 1 was duplicated using, as the starting monomers, a 50/50 (volume mixture of ethyl-acrylate and methylmethacrylate. The conversion to polymer was 99%. The average diameter of the particles was about 530 A.

EXAMPLE 10

Example 9 was duplicated using methylmethacrylate as the starting monomer.

EXAMPLE 11

Example 1 was duplicated, with the exception that 1.5 g of sodium n-(4-nonyl-phenoxy-acetyl)-sarcosinate were used as a dispersant, instead of using sodium lauroyl-sarcosinate. The conversion to polymer was of 92% and the average diameter of the particles about 620 A. according to Heller-Pangonis' method.

EXAMPLE 12

Example 1 was duplicated, but using 1.5 g of ammonium N-palmitoyl-sarcosinate as a dispersant. The polymer conversion was of 90% and the average diameter of the particles of 560 A.

EXAMPLE 13

(comparison) Example 8 was duplicated using 1.5 g of sodium lauryl sulfate in place of sodium lauroyl-sarcosinate, as the dispersant. The average dimensions of the particles were about 500 A. in diameter.

EXAMPLE 14

(comparison) Example 5 was duplicated using 2.5 g of sodium di-octyl-sulfosuccinate as the dispersant. Particles with an average diameter of about 550 A. were obtained.

EXAMPLE 15

(comparison) Example 9 was duplicated using 1.5 g of cetyl-trimethyl-ammonium chloride. A latex containing particles with an average diameter of about 600 A. were obtained.

EXAMPLE 16

A high sensitivity silver halide photographic emulsion containing 2 mole % AgI and 98 mole % AgBr was ripened in ammoniacal environment to provide an average grain dimension of 1.4 u. It was then coagulated by addition of sodium sulfate and was repeatedly washed with cold water. The emulsion was then redispersed by addition of a gelatin solution so as to have a final Ag/-gelatin ratio of about 1.8. The emulsion was then chemically ripened, stabilized, and divided into five equal portions. To each portion latex was added so as to attain a polymer/gelatin ratio of 40/60 as follows:

Portion No. 1: latex obtained according to Example 13 (comp.)
Portion No. 2: latex obtained according to Example 9
Portion No. 3: latex obtained according to Example 2
Portion No. 4: latex obtained according to Example 3
Portion No. 5: latex obtained according to Example 7

After addition of ordinary coating aids to the above listed five emulsion, they were respectively coated onto the two faces of a 0.18 mm polyster self-supporting film so as to provide a silver weight of about 4 g/m². Over each photosensitive layer was then coated a thin protective layer of a hardener-containing gelatin.

Contact angle measurements yielded the following results:

Table 1

| Portion | Contact angle | Latex |
| --- | --- | --- |
| 1 | 72° | Example 13 (comparison) |
| 2 | 30° | Example 9 |
| 3 | 35° | Example 2 |
| 4 | 33° | Example 3 |
| 5 | 25° | Example 7 |

A 24×30 cm plate for each emulsion portion was then prepared and was exposed and afterwards manually developed in a common hydroquinone-phenidone-sulfite developer solution, fixed, washed and dried.

The plate prepared with the emulsion previously indicated as Portion No. 1 displayed numerous spots (so called "drying spots") while the plates prepared with emulsions No. 2, 3, 4 and 5 were substantially free from this defect.

By observing the plates in reflected light, these "drying spots" appear to be lighter than the average background density. When observed by transmitted light, they appear to be darker than the average background density. In the latter case, diffuse lines also can be noticed (which are darker than the average background density). To the extent that these defects may lead to an erroneous medical interpretation of a radiogram, they assume serious proportions.

A sensitometric sample of each of these five plates wax exposed to 60 KV X-rays using fluorescent Par Speed reinforcing screens of the type normally used for medical radiography through an aluminum step wedge with a constant of 0.1 1g lt. The exposed samples were then processed in an automatic developing machine (PAKO) containing commercial processing solutions. The total processing time from dry to dry was 90 seconds at a developing temperature of 35°C. Sensitometric evaluation yielded the following results:

Table 2

| Sample | Latex | Chemical fog + support density under white light | Relative sensitivity in lg It units | Dmax | Contrast |
|---|---|---|---|---|---|
| 1 | (comp) Ex. 13 | 0.23 | 1.65 | 3.65 | 2.40 |
| 2 | Ex. 9 | 0.24 | 1.65 | 3.90 | 2.50 |
| 3 | Ex. 2 | 0.22 | 1.64 | 3.70 | 2.38 |
| 4 | Ex. 3 | 0.24 | 1.66 | 3.87 | 2.55 |
| 5 | Ex. 7 | 0.22 | 1.63 | 3.65 | 2.40 |

EXAMPLE 17

A gelatin-silver bromo-iodide emulsion (octahedral crystals) containing approximately 7.5 mole % iodide and 92.5 mole % bromide was prepared and ripened in an ammoniacal environment to an average grain dimension of 1.2 u. The emulsion was then coagulated, washed and redispersed by addition of a gelatin solution to yield a final silver: gelatin ratio of about 0.8. The emulsion was then chemically digested, optically sensitized, stabilized according to known techniques, and subsequently was divided into four equal portions. A latex was then added to each portion so as to provide a final polymer; gelatin ratio of 30/70 as follows:

Portion No. 1: latex of Example 15 (comparison)
Portion No. 2: lates of Example 2
Portion No. 3: latex of Example 9
Portion No. 4: latex of Example 5

After additon of common coating aids, the emulsions were coated on 0.20 mm cellulose triacetate film samples to a silver weight of about 5 g/m². Each emulsion layer was subsequently coated with a thin protective layer of a hardener-containing gelatin.

Each sample was then exposed to light of color temperature 2850°K for 1/50th of a second, under a step wedge with a 0.3 lg It constant, and then manually developed, fixed and washed. For the development, the same developer of the previous example was used.

The samples were sensitometrically evaluated and they showed the following results:

Table 3

| Sample | latex | Fog | Relative Sensitivity | Dmax |
|---|---|---|---|---|
| 1 | Example 15 (comp.) | 0.55 | 1.45 | 3.40 |
| 2 | Example 2 | 0.18 | 1.65 | 3.50 |
| 3 | Example 9 | 0.20 | 1.65 | 3.75 |
| 4 | Example 5 | 0.19 | 1.63 | 3.70 |

EXAMPLE 18

A fine-grained silver chloro-bormide emulsion of cubic habit containing approximately 40 mole % silver bromide and 60 mole % silver chloride was prepared by physical ripening in an excess of chlorine ion to provide an average grain dimension of 0.3–0.4 u. The emulsion was then coagulated, washed and redispersed by addition of a gelatin solution, to provide a final silver:gelatin ratio of about 1.2.

The emulsion was then chemically digested, optically sensitized and stabilized, and was divided into four portions. A latex was added to each portion, to provide a polymer:gelatin ratio of 30/70 as follows:

Portion No. 1: latex of Example 14 (comparison)
Portion No. 2: latex of Example 7
Portion No. 3: latex of Example 10
Portion No. 4: latex of Example 8

After addition of common coating aids, the emulsions were coated on 0.18 mm polyester film samples to a silver weight of about 4 g/m² and then the emulsion layer was covered with a thin protective layer of a hardener-containing gelatin. Four 30×40 cm plates were thus prepared. Each plate was manually processed in a metol-hydroquinone-sulfite developer (suitable for manual processing), fixed, washed and dried.

The plates prepared with emulsion 1, displayed evident "drying spots", while the other plates were substantially free of these spots.

EXAMPLE 19

A silver halide emulsion containing 1.8 mole % silver iodide and 98.2 mole % silver bromide, was physically ripened in an ammoniacal environment to yield an average grain dimension of 0.8 u. The emulsion was coagulated, repeatedly washed with cold water, and then was redispersed by addition of a gelatin solution to yield a final silver:gelatin ratio of about 1.0.

The emulsion was then chemically digested, stabilized, and divided into five portions. To each portion latex was added to give a polymer: gelatin ratio of 20/80 as follows:

Portion No. 1: latex of Example 14 (comparison)
Portion No. 2: latex of Example 8
Portion No. 3: latex of Example 2
Portion No. 4: latex of Example 4
Portion No. 5: latex of Example 10

After the addition of common coating aids, the five emulsions were coated on both surfaces of 0.20 mm cellulose triacetate film samples so as to provide a total silver weight of about 20 g/m². Each emulsion layer was then coated with a thin protective layer of a hardener-containing gelatin. After developing, fixing and washing, a sample of each of the emulsion coatings was subjected to the measurement of the contact angle according to the above mentioned procedure to yield the following results:

Table 4

| Sample | Contact angle | Latex |
|---|---|---|
| 1 | 64° | Example 14 (comp.) |
| 2 | 27° | Example 8 |
| 3 | 25° | Example 2 |
| 4 | 23° | Example 4 |
| 5 | 25° | Example 10 |

Subsequently 24×30 cm plates were prepared from each emulsion, and each plate was exposed, manually developed, fixed, washed and dried. As a developing bath a hydroquinone, phenidone, sulfite solution of the type suitable for manual processing of radiographic plates was used.

The plate prepared with emulsion 1, displayed numerous "drying spots", while the plates prepared with emulsions 2, 3, 4 and 5 were substantially free of this defect.

EXAMPLE 20

A high sensitivity silver halides photographic emulsion containing 2 mole % AgI and 98 mole % AbBr, has been prepared by ripening in ammoniacal environment obtaining an average grain dimension of 1.4 u. It was then coagulated by addition of sodium sulfate and was repeatedly washed with cold water. The emulsion was then redispersed by addition of a gelatin solution so as to have a final Ag/gelatin ratio of about 1.8. The emulsion was then chemically ripened, stabilized and then divided into three equal portions. To each portion latex was added so as to attain a polymer:gelatin ratio of 40/60 as follows:

Portion No. 1: latex obtained according to Example 13 (comp.)
Portion No. 2: latex obtained according to Example 11
Portion No. 3: latex obtained according to Example 12

After addition of ordinary coating aids to the above listed three emulsions, they were respectively coated onto the two faces of a 0.18 mm polyester self-supporting film, so as to provide a silver weight of about 4 g/cm². Over each photosensitive layer was then coated a thin protective layer of a hardener-containing gelatin.

Contact angle measurements yielded the following results:

Table 5

| Sample | Contact angle | Latex |
|---|---|---|
| 1 | 76° | Example 13 (comparison) |
| 2 | 32° | Example 11 |
| 3 | 25° | Example 12 |

A 24×30 cm plate for each emulsion portion was then prepared and was exposed and afterwards manually processed in a common hydroquinone-phenidone-sulfite developer solution, fixed, washed, and dried.

The plate prepared with the emulsion previously indicated as portion no. 1, displayed numerous spots (so called "drying spots"), while the plates prepared with emulsions no. 2 and 3 were substantially free from this defect.

The following examples were performed in order to illustrate the effects of the surface active agents of the present invention on photographic emulsions, especially in comparison with known photographic surfactants.

EXAMPLE 21

The polymerization reaction of Example 1 was performed without adding the surfactant (sodium lauroyl sarcosinate). Polymerization began normally, however, substantially all of the polymer formed separated onto the walls of the flask. No substantial amount of useful latex was formed by this technique. This material was totally unsuitable for combination with a gelatin emulsion.

EXAMPLE 22

The reaction of Example 21 was repeated, increasing the quantity of polymerization initiator by 10 times (to 0.20 g persulfate). One part of the polymer formed separated onto the walls of the flask and the stirrer. The second part of the polymer formed a lactescent, dispersion with a yield of 77% dispersed polymer. The average size of the particles was about 1900 A.

* As expected, this latex without surfactant was not stable. In fact, after ten days standing the polymer separated completely.

EXAMPLE 23

The following reaction was performed according to Example 1 using surface active agents known in the prior art (U.S. Pat. No. 2,739,891).

A solution of 1.6 g potassium N-methyl-N-lauroyltaurate in 120 ml of distilled and deaerated water was introduced into a 250 ml flask provided with a joint-articulated blade stirrer, reflux column, thermometer and dropping funnel. The temperature was raised to about 50°C insuring complete dissolution of the surfactant. Then 10 ml ethyl acrylate (freshly distilled) and 0.06 g ammonium persulfate were added to the solution with stirring. The temperature was raised to 82°C and stirring continued. At this temperature, the polymerization reaction began with clarification of the emulsion and strong reflux. After a few minutes 50 ml of ethyl acrylate (freshly distilled) was added slowly through the dropping funnel. After this addition, the temperature was raised up to 92°–95°C and maintained for one hour.

Approximately 40 ml of water was distilled under reduced pressure (400–600 mm Hg) until there was a complete absence of the unreacted residual monomer. The whole was then cooled at room temperature, filtered and distilled water was added there up to a volume of 200 ml.

The polymer latex yield was 98% with an average particle size of 540 A.

Other prior art latexes are reported in Examples 13, 14 and 15.

EXAMPLE 24

A. The latex of Example 23 was added dropwise to an 8% water solution of gelatin at 40°C with continuous stirring. A polymer to gelatin ratio of 40:60 was reached with no coagulation and excellent dispersion of the materials.

B. The latex of Example 1 was added dropwise to an 8% water solution of gelatin at 40°C with continuous stirring. A polymer to gelatin ratio of 40:60 was reached with no coagulation and excellent dispersion of the ingredients.

C. The latex of Example 22, freshly prepared, was added dropwise to an 8% water solution of gelatin at 40°C with continuous stirring and the polymer coagulated during addition.

D. The latex of Example 22, freshly prepared, was added dropwise to an 8% water solution of gelatin at 40°C, containing 3% w/w (with respect to the gelatin) of sodium N-lauroyl sarcosinate. The polymeric dispersion coagulated.

E. The latex of Example 22, freshly prepared, was added dropwise to an 8% water solution of gelatin at 40°C, containing 3% w/w of sodium N-methy-N-lauroyl taurate instead of the sarcosinate. Also in this case the polymer was not compatible with the gelatin.

F. The latex of Example 22, freshly prepared, was added with 4.5% w/w (with respect to the polymer) of sodium N-lauroyl sarcosinate and then added dropwise to an 8% water solution of gelatin at 40°C with continuous stirring. A polymer to gelatin ratio of 40:60 was reached with very little coagulation and good dispersion of the materials.

G. The latex of Example 22, freshly prepared, was added with 4.5% w/w of sodium N-methyl-N-lauroyl taurate and then added dropwise to an 8% water solution of gelatin at 40°C with continuous stirring. A polymer to gelatin ratio of 40:60 was reached with no coagulation and good dispersion of the ingredients.

Dispersions A, B, F and G were filtered and identically coated onto a cellulose triacetate base so as to obtain a dry layer of 10 $\mu$ thickness.

The films coated with the gelatin-polymer mixtures A and B resulted perfectly clear, both in the dry and wet state, whereas the films coated with the gelatin-polymer mixtures F and G resulted very lactescent.

The transparence of these films was determined on both the dried film and on the swollen film (after swelling with water at 20°C for 10 minutes) by density measurements with a conventional densitometer.

The optical densities resulted to be the following:

| Film | Dry | Swollen |
|------|------|---------|
| A | 0.03 | 0.07 |
| B | 0.04 | 0.08 |
| F | 0.12 | 0.24 |
| G | 0.10 | 0.22 |

These results show that dispersions C, D and E coagulated and therefore are not useful for making photographic elements.

Dispersions F and G gave non-transparent layers and cannot, therefore, be used for making photographic elements. As expected, the latexes obtained according to the method described in Example 22, i.e. without addition of any surfactant prior to polymerization, cannot be used for making photographic emulsions.

Only dispersions A and B gave perfectly clear layers both in the dry state and in the wet state, and can therefore be used for making photographic elements. However, the photographic films containing gelatin-polymer mixtures of type A display drying spots after exposure, developing, fixing, washing, and drying, whereas films containing gelatin-polymer mixtures of type B are substantially free of such spots. This fact is better illustrated in the following example.

EXAMPLE 25

A silver halide emulsion obtained as described in Example 19 was divided into three portions. To each portion latex was added to give a polymer: gelatin ratio of 40:60 as follows:

Portion No. 1 : latex of Example 23 (prior art)
Portion No. 2 : latex of Example 1
Portion No. 3 : latex of Example 2

After the addition of common coating aids, the three emulsions were coated on both surfaces of 0.20 mm cellulose triacetate film samples so as to provide a total silver weight of about 20 g/m². Each emulsion layer was then coated with a thin protective layer of a hardener-containing gelatin. After exposure, developing, fixing, and washing, a sample of each of the emulsion coatings was subjected to the measurement of the contact angle according to the above mentioned procedure to yield the following results:

Table 4

| Example | Contact Angle | Latex |
|---------|---------------|-------|
| 1 | 53° | Example 23 (prior art) |
| 2 | 28° | Example 1 |
| 3 | 30° | Example 2 |

Subsequently 24×30 cm plates were prepared from each emulsion, and each plate was exposed, manually developed, fixed, washed and dried. As a developing bath a hydroquinone, phenidone, sulfite solution of the type suitable for manual processing of radiographic plates was used.

The plate prepared with emulsion sample 1, displayed numerous "drying spots", while the plates prepared with emulsion samples 2 and 3 were substantially free of this defect.

What is claimed is:

1. A silver halide photographic emulsion which includes, as a binder, a mixture of gelatin and at least a water-insoluble dispersed polymer, said polymer having been prepared by emulsion polymerization of ethylenically unsaturated monomers in the presence of a dispersant of the general formula

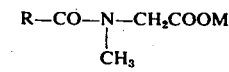

wherein R is a saturated or unsaturated hydrocarbon chain having 8 to 17 C atoms, and m is an alkali metal atom or ammonium.

2. A silver halide photographic emulsion according to claim 1 wherein the dry weight ratio of gelatin to dispersed polymer ranges from about 90/10 to about 20/80.

3. The silver halide photographic emulsion according to claim 1 wherein said dispersed polymer is the reaction product of the emulsion polymerization of ethyl acrylate in the presence of sodium N-palmitoyl sarcosinate.

4. The silver halide photographic emulsion according to claim 1 wherein said dispersed polymer is the reaction product of the emulsion polymerization of a mixture of methylmethacrylate and ethyl-acrylate in the presence of sodium N-lauroyl sarcosinate.

5. The silver halide photographic emulsion according to claim 1 wherein said dispersed polymer is the copolymer resulting from the emulsion polymerization, in the presence of sodium N-lauroyl sarcosinate, of a 95/5 mixture of ethylacrylate and N-vinyl-2-oxazolidone.

6. In the preparation of a photosensitive gelatino silver halide emulsion, the improvement which comprises adding, to a gelatino silver halide photographic emulsion, a latex of a water-insoluble polymer obtained by the emulsion polymerization of ethylenically unsaturated monomers in the presence of a dispersant of the formula

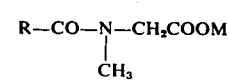

wherein R is a saturated or unsaturated hydrocarbon chain containing from 8 to 17 C atoms, and M is an alkali metal atom or ammonium.

7. A silver halide photographic element having at least one layer of the emulsion of claim 1.

8. The photographic emulsion of claim 1, wherein the hydrocarbon chainn carries an aromatic ring.

9. The preparation of claim 6 in which the hydrocarbon chain carries an aromatic ring.

* * * * *